United States Patent
Oba et al.

(10) Patent No.: US 8,649,403 B2
(45) Date of Patent: Feb. 11, 2014

(54) FIBER LASER DEVICE

(75) Inventors: Yasuhiro Oba, Sakura (JP); Michihiro Nakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/606,235

(22) Filed: Sep. 7, 2012

(65) Prior Publication Data

US 2013/0034113 A1 Feb. 7, 2013

Related U.S. Application Data

(63) Continuation of application No. PCT/JP2011/054515, filed on Feb. 28, 2011.

(30) Foreign Application Priority Data

Mar. 10, 2010 (JP) .................................. 2010-052851

(51) Int. Cl.
*H01S 3/30* (2006.01)

(52) U.S. Cl.
USPC ......... 372/6; 372/69; 372/70; 372/72; 372/75

(58) Field of Classification Search
USPC ...................................... 372/6, 69, 70, 72, 75
See application file for complete search history.

(56) References Cited

U.S. PATENT DOCUMENTS

| | | | |
|---|---|---|---|
| 5,463,650 A | 10/1995 | Ito et al. | |
| 6,008,497 A | 12/1999 | Mizoguchi et al. | |
| 6,330,258 B1 | 12/2001 | Kawamura | |
| 7,889,422 B2 * | 2/2011 | Furuya et al. | ................. 359/326 |
| 8,009,705 B2 * | 8/2011 | Keaton et al. | ...................... 372/6 |
| 2008/0013163 A1 | 1/2008 | Leonardo et al. | |
| 2009/0103576 A1 * | 4/2009 | Achtenhagen | ................... 372/22 |
| 2010/0177797 A1 * | 7/2010 | Appleyard et al. | ......... 372/38.03 |
| 2011/0019705 A1 * | 1/2011 | Adams et al. | .................... 372/25 |
| 2011/0317726 A1 * | 12/2011 | Tamaoki | ......................... 372/25 |

FOREIGN PATENT DOCUMENTS

| | | |
|---|---|---|
| JP | 06-037376 A | 2/1994 |
| JP | 09-248682 A | 9/1997 |
| JP | 11-238934 A | 8/1999 |
| JP | 2000-208841 A | 7/2000 |
| JP | 2006-305597 A | 11/2006 |
| JP | 2008-091773 A | 4/2008 |
| JP | 2011-018711 A | 1/2011 |
| WO | 2011/004806 A1 | 1/2011 |

OTHER PUBLICATIONS

International Search Report of PCT/JP2011/054515, mailing date of Mar. 22, 2011.

* cited by examiner

*Primary Examiner* — Yuanda Zhang
(74) *Attorney, Agent, or Firm* — Westerman, Hattori, Daniels & Adrian, LLP

(57) ABSTRACT

When an output instruction is input to a control unit, the control unit controls a seed laser light source and a pumping light source to be either in a pre-pumped state or in an output state. In the pre-pumped state, the pumping light source outputs, for a predetermined period, pumping light with an intensity determined based on the duration of the period of time from when the output state prior to the input of the output instruction to the control unit comes to an end till when the output instruction is input to the control unit. In the output state, to cause the output unit to output laser light, the seed laser light source outputs laser light, and the pumping light source outputs pumping light.

7 Claims, 5 Drawing Sheets

FIG. 3

| DURATION OF PERIOD (T) | T1 or more | T1~T2 | T2~T3 | ......... | Tn-1~Tn |
|---|---|---|---|---|---|
| INTENSITY (R) OF PRE-PUMPING LIGHT | R1 | R2 | R3 | ......... | Rn |

FIBER LASER DEVICE

TECHNICAL FIELD

The invention relates to fiber laser devices.

BACKGROUND ART

In recent years, fiber laser devices have been used in processing machines for performing processing with laser light, medical devices such as surgical knives using laser light, and the like. In a fiber laser device, laser light generated from a laser oscillator and pumping light are input to an amplification optical fiber, and the amplified laser light is output from an output unit.

In such a fiber laser device, a certain period of time is required for the intensity of laser light to be stabilized from when the laser light is started to be output from the fiber laser device. That is, a certain period of time is required for laser light to rise.

As the rise time of laser light becomes shorter, the work efficiency becomes higher. Patent Document 1 listed below discloses a fiber laser device that requires a short period of time to stabilize the intensity of laser light.

In the fiber laser device disclosed in Patent Document 1 listed below, pumping light with a low and constant intensity is input to an amplification optical fiber during a period before laser light is output from the fiber laser device (a standby period), and a rare-earth element doped in the amplification optical fiber is pumped. That is, pre-pumping is performed before laser light is output. When laser light is output from the fiber laser device, seed laser light and pumping light with a high intensity are input to the amplification optical fiber, and amplified laser light is output. In this manner, before laser light is output from the fiber laser device, the rare-earth element in the amplification optical fiber is pumped by pre-pumping. Accordingly, the rise time of the laser light output from the fiber laser device is short (Patent Document 1).

CITATION LIST

Patent Document

[Patent Document 1] Japanese Patent Application Laid-Open No. 2008-91773

SUMMARY OF INVENTION

Objects to be Achieved by the Invention

The fiber laser device disclosed in Patent Document 1 listed above has a short laser light rise time, but the laser light rise time varies, and there is room for improvement.

Therefore, an object of the invention is to provide a fiber laser device capable of restraining variations of the rise time of output laser light while shortening the rise time of the output laser light.

Means for Achieving the Objects

To achieve the above object, the inventors made intensive studies to find the causes of variations in the period required for the intensity of laser light to be stabilized from when the laser light is started to be output from the fiber laser device disclosed in Patent Document 1 listed above. As a result, the inventors discovered that the causes are such that the pumped state of the rare-earth element in the amplification optical fiber varies at the time when laser light is about to be output from the fiber laser device after pre-pumping.

Specifically, in the fiber laser device disclosed in Patent Document 1 listed above, the pumped state of the rare-earth element in the amplification optical fiber might vary with the duration of the standby period in which the rare-earth element in the amplification optical fiber is pre-pumped. For example, in a case where the pre-pumping period is very short, the level of the pumped state of the rare-earth element in the amplification optical fiber is low at the time when laser light is output. In a case where the pre-pumping period is sufficiently long, on the other hand, the level of the pumped state of the rare-earth element in the amplification optical fiber is high at the time when laser light is output.

In view of this, the inventors considered that, by using a fiber laser device having a constant pre-pumping period and having constant-intensity pumping light input to the amplification optical fiber, the level of the pumped state of the rare-earth element in the amplification optical fiber could be made constant at the time when the fiber laser device was about to output laser light. However, it was found that in such a fiber laser device, the pumped state of the rare-earth element in the amplification optical fiber still varied at the time when the fiber laser device was about to output laser light.

In view of the above, the inventors further looked into the cause, and considered that the cause lay in the fact that the pumped state of the rare-earth element varied at the time when pre-pumping started. Specifically, the level of the pumped state of the rare-earth element in the amplification optical fiber becomes lower with time after an end of laser output. Therefore, in a case where pre-pumping is performed sufficiently long after an end of laser light output, the level of the pumped state of the rare-earth element is sufficiently low at the time when pumping light for pre-pumping is input. In a case where pre-pumping light is input shortly after an end of laser light output, on the other hand, the level of the pumped state of the rare-earth element is still high at the time when the pumping light for pre-pumping is input. As described above, the pumped state of the rare-earth element in the amplification optical fiber varies with the duration of the period of time from when laser light output comes to an end till when the next pre-pumping starts. Even if pumping light with a constant intensity for pre-pumping is input for a certain period of time to the amplification optical fiber with a varying pumped state, the pumped state of the rare-earth element in the amplification optical fiber varies at the time when laser light is about to be output.

Therefore, the inventors paid attention to the relationship between the period of time from when laser light output comes to an end till when pre-pumping starts and the intensity of pumping light in pre-pumping, and has developed the invention.

Specifically, a fiber laser device of the invention includes: a seed laser light source that outputs seed laser light; a pumping light source that outputs pumping light; an amplification optical fiber that receives the seed laser light and the pumping light, amplifies the seed laser light, and outputs the seed laser light as laser light, the amplification optical fiber being doped with a rare-earth element, the rare-earth element being pumped by the pumping light; an output unit that outputs the laser light output from the amplification optical fiber; a control unit that controls at least the seed laser light source and the pumping light source; and an output instructing unit that inputs an output instruction to the control unit, the output instruction causing the output unit to output the laser light. In this fiber laser device, when the output instruction is input to the control unit, the control unit controls the seed laser light source and the pumping light source to switch from a pre-pumped state to an output state. In the pre-pumped state, the seed laser light source does not output the seed laser light while the pumping light source outputs the pumping light for a predetermined period of time. In the output state, the seed laser light source outputs the seed laser light, and the pumping light source outputs the pumping light, to cause the output unit to output the laser light. The intensity of the pumping light in the pre-pumped state is determined based on the duration of the period of time from when the output state prior to the input of the output instruction to the control unit comes to an end till when the output instruction is input to the control unit.

In such a fiber laser device, when an output instruction is input from the output instructing unit to the control unit, the control unit controls, for a predetermined period of time, the seed laser light source and the pumping light source to enter the pre-pumped state, controls the seed laser light source not to output seed laser light, and controls the pumping light source so that pumping light is input to the amplification optical fiber. Therefore, the level of the pumped state of the rare-earth element in the amplification optical fiber becomes higher. The control unit then controls the seed laser light source and the pumping light source to enter the output state, so that seed laser light and pumping light are input to the amplification optical fiber. As described above, the rare-earth element in the amplification optical fiber is pumped in the pre-pumped state, and seed laser light and pumping light are input to the amplification optical fiber in such a state. Accordingly, the rise time of laser light that is output from the output unit can be made shorter in the output state.

Further, the intensity of the pumping light in the pre-pumped state is determined based on the duration of the period of time from when the output state prior to the input of the output instruction to the control unit comes to an end till when the output instruction is input to the control unit. As for the intensity determined based on the duration of the period of time from when the output state prior to the input of the output instruction to the control unit comes to an end till when the output instruction is input to the control unit, the intensity of pumping light is set at a high intensity where the output instruction is input to the control unit sufficiently long after the output state prior to the input of the output instruction to the control unit comes to an end, and the intensity of the pumping light in the pre-pumped state is set at a low intensity where the output instruction is input to the control unit shortly after the output state prior to the input of the output instruction to the control unit comes to an end.

That is, at the time when a pre-pumped state is started, the intensity of pumping light is set at a high intensity if the level of the pumped state of the rare-earth element in the amplification optical fiber is low, and the intensity of the pumping light is set at a low intensity if the level of the pumped state of the rare-earth element in the amplification optical fiber is high. In this manner, the intensity of pumping light is determined in accordance with the pumped state of the rare-earth element in the amplification optical fiber, and the pumping light is input to the amplification optical fiber for a certain period of time. Accordingly, at the time when an output state is started, variations of the pumped state of the rare-earth element are restrained. As described above, laser light and pumping light are input to a pumped amplification optical fiber having variations restrained. Accordingly, variations of the rise time of laser light that is output from the output unit can be restrained.

The above described fiber laser device preferably further includes: a wavelength converter that is provided between the amplification optical fiber and the output unit, does not perform a wavelength conversion on light generated and output from the amplification optical fiber by the pumping light in the pre-pumped state, and performs a wavelength conversion on the laser light output from the amplification optical fiber by the seed laser light and the pumping light in the output state; and an optical filter that is provided between the wavelength converter and the output unit, and, when light in the same wavelength band as the seed laser light is input to the wavelength converter, passes light having its wavelength converted by the wavelength converter but restrains transmission of light not having its wavelength converted by the wavelength converter.

The wavelength converter is formed with an optical fiber that causes stimulated Raman scattering, for example. In a case where the crest value of the intensity of input light is large, this wavelength converter converts the input light into a longer-wavelength light, and then outputs the longer-wavelength light. In a case where the crest value of the intensity of input light is small, this wavelength converter does not convert the wavelength of the input light, and outputs the input light as it is. In this fiber laser device, when amplified laser light is output from the amplification optical fiber in the output state, the laser light is subjected to a wavelength conversion by the wavelength converter, since the crest value of the intensity of the laser light is large. The wavelength-converted laser light passes through the optical filter, and is output from the output unit. In the pre-pumped state, however, the rare-earth element in the amplification optical fiber is pumped by pumping light, but seed laser light is not input to the amplification optical fiber. Accordingly, only spontaneous emission light generated by the pumped rare-earth element is output from the amplification optical fiber. This spontaneous emission light has a great spectrum width and a low intensity as its crest value. Accordingly, even if light generated by amplifying the spontaneous emission light is output from the amplification optical fiber, the wavelength converter does not perform a wavelength conversion on the output light. Accordingly, even in a case where light generated by amplifying the spontaneous emission light is output from the amplification optical fiber, transmission of light that is output from the wavelength converter and is input to the optical filter is restrained by the optical filter. In this manner, in the pre-pumped state, the output unit can be restrained from outputting unnecessary light.

Alternatively, a fiber laser device of the invention includes: a seed laser light source that outputs seed laser light; a pumping light source that outputs pumping light; an amplification optical fiber that receives the seed laser light and the pumping light, amplifies the seed laser light, and outputs the seed laser light as laser light, the amplification optical fiber being doped with a rare-earth element, the rare-earth element being pumped by the pumping light; an output unit that outputs the laser light output from the amplification optical fiber; a control unit that controls at least the seed laser light source and the pumping light source; and an output instructing unit that inputs an output instruction to the control unit, the output instruction causing the output unit to output the laser light. In this fiber laser device, when the output instruction is input to the control unit, the control unit controls the seed laser light source and the pumping light source to switch from a pre-pumped state to an output state. In the pre-pumped state, the seed laser light source outputs low-intensity seed laser light while the pumping light source outputs the pumping light for a predetermined period of time. In the output state, the seed laser light source outputs the seed laser light, and the pumping light source outputs the pumping light, to cause the output unit to output the laser light. The intensity of the pumping light in the pre-pumped state is determined based on the duration of the period of time from when the output state prior to the input of the output instruction to the control unit comes to an end till when the output instruction is input to the control unit.

In such a fiber laser device, low-intensity seed laser light is input to the amplification optical fiber in the pre-pumped state. Accordingly, pumping of the rare-earth element by the pumping light and relaxing of the rare-earth element by the seed laser light can be balanced. Thus, it is possible to prevent the rare-earth element from being so pumped as to be unstable, and unintended laser oscillations can be restrained in the pre-pumped state.

Further, in the above fiber laser device, the laser light output from the laser light source in the output state may be pulsed light, and the laser light output from the laser light source in the pre-pumped state may be continuous light.

Further, the above described fiber laser device preferably further includes: a wavelength converter that is provided between the amplification optical fiber and the output unit, does not perform a wavelength conversion on light output from the amplification optical fiber by the seed laser light and the pumping light in the pre-pumped state, and performs a wavelength conversion on the laser light output from the amplification optical fiber by the seed laser light and the pumping light in the output state; and an optical filter that is provided between the wavelength converter and the output unit, and, when light in the same wavelength band as the seed laser light is input to the wavelength converter, passes light having its wavelength converted by the wavelength converter but restrains transmission of light not having its wavelength converted by the wavelength converter.

In such a fiber laser device, the seed laser light with the very low intensity that is input to the amplification optical fiber in the pre-pumped state is amplified by stimulated emission from the rare-earth element and is output from the amplification optical fiber. However, the wavelength converter is designed not to perform a wavelength conversion on the light that is output from the amplification optical fiber and is input to the wavelength converter at this point. Accordingly, the output unit can be restrained from outputting laser light in the pre-pumped state.

Further, in the above described fiber laser device, the intensity of the pumping light in the pre-pumped state is preferably equal to or lower than the intensity of the pumping light in the output state.

The above fiber laser device preferably further includes a memory that stores the relationship between the duration of the period of time from when the output state prior to the input of the output instruction to the control unit comes to an end till when the output instruction is input to the control unit, and the intensity of the pumping light in the pre-pumped state. In this fiber laser device, the intensity of the pumping light in the pre-pumped state is read from the memory, based on the duration of the period of time from when the output state prior to the input of the output instruction to the control unit comes to an end till when the output instruction is input to the control unit.

Effect of the Invention

According to the invention, a fiber laser device capable of restraining variations of the rise time of output laser light while shortening the rise time of the output laser light can be provided.

BRIEF DESCRIPTION OF THE DRAWINGS

FIG. 3 is a conceptual diagram showing the table stored in the memory shown in FIG. 1.

EMBODIMENTS OF THE INVENTION

Preferred embodiments of fiber laser devices according to the invention will be described in detail below with reference to the accompanying drawings.

(First Embodiment)

Figure 1:
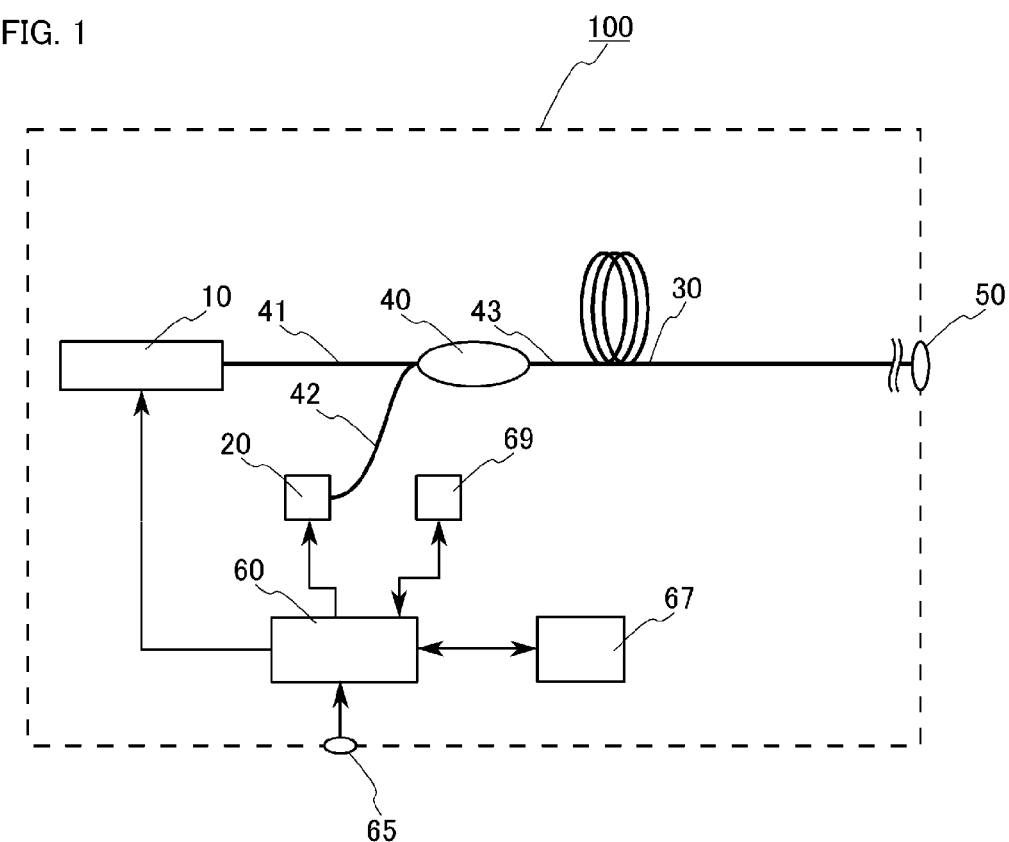
FIG. 1 is a diagram showing a fiber laser device according to a first embodiment of the invention.

FIG. 1 is a diagram showing a fiber laser device according to a first embodiment of the invention.

As shown in FIG. 1, a fiber laser device 100 includes as main components: a seed laser light source 10 that outputs seed laser light at a wavelength λ1; a pumping light source 20 that outputs pumping light; an amplification optical fiber 30 to which the pumping light and the laser light are input; an optical coupler 40 that inputs the pumping light and the seed laser light to the amplification optical fiber 30; an output unit 50 that outputs the light output from the amplification optical fiber 30; a control unit 60 that controls the seed laser light source 10 and the pumping light source 20; an output instructing unit 65 that inputs an output instruction to the control unit 60 to cause the output unit 50 to output the laser light; and a memory 67 that stores the intensity of the pumping light output from the pumping light source 20 in accordance with the intensity of the laser light output from the output unit 50.

Figure 2:
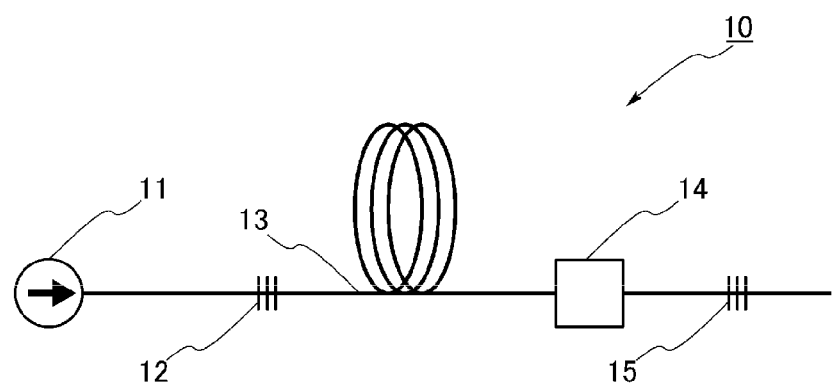
FIG. 2 is a diagram showing the seed laser light source of FIG. 1.

FIG. 2 is a diagram showing the seed laser light source 10 of FIG. 1. In this embodiment, a laser output device of a Fabry-Perot type is used as the seed laser light source 10. As shown in FIG. 2, the seed laser light source 10 includes: a laser oscillator 11 that outputs pumping light; a rare-earth doped fiber 13 to which the pumping light from the laser oscillator 11 is input; a first FBG (Fiber Bragg Grating) 12 provided between the rare-earth doped fiber 13 and the laser oscillator 11; a second FBG 15 provided on the opposite side of the rare-earth doped fiber 13 from the laser oscillator 11; and an AOM (Acoustic Optical Modulator) 14 provided between the second FBG 15 and the rare-earth doped fiber 13.

The laser oscillator 11 is a semiconductor laser, and outputs pumping light. The output pumping light has a wavelength of 975 nm, for example. The pumping light output from the laser oscillator 11 is input to the rare-earth doped fiber 13 via the first FBG 12. At the rare-earth doped fiber 13, the pumping light is absorbed by the rare-earth element doped in the rare-earth doped fiber 13. Accordingly, the rare-earth element is pumped. The rare-earth element in the pumped state emits spontaneous emission light including a predetermined wavelength λ1. The wavelength λ1 of the spontaneous emission light at this point is 1064 nm, for example. The spontaneous emission light propagates through the rare-earth doped fiber 13, and is input to the AOM 14. The AOM 14 is controlled to repeatedly switch between a low-loss state and a high-loss state in a cyclic manner, or is controlled to maintain a low-loss state.

In a case where the AOM 14 is controlled to repeatedly switch between a low-loss state and a high-loss state, the AOM 14 restrains transmission of spontaneous emission light when in a high-loss state, and passes spontaneous emission light when in a low-loss state. Therefore, when the AOM 14 is in a low-loss state, spontaneous emission light is input to the second FBG 15 via the AOM 14. The second FBG 15 selectively reflects light in a wavelength band including $\lambda 1$, at a reflectivity of approximately 50% or lower. Therefore, the reflected spontaneous emission light is input back to the rare-earth doped fiber 13 via the AOM 14, and is amplified by stimulated emission from the rare-earth element in the rare-earth doped fiber 13. The amplified light then reaches the first FBG 12. The first FBG 12 selectively reflects light in a wavelength band including the wavelength $\lambda 1$, at a reflectivity of 99.5%, for example. Therefore, the light reflected by the first FBG 12 is input back to the rare-earth doped fiber 13, and is then amplified. The amplified light is then input to the second FBG 15 via the AOM 14, and part of the light passes through the second FBG 15. In the above manner, the first FBG 12 and the second FBG 15 form a Fabry-Perot oscillator. In synchronization with the operation of the AOM 14 repeatedly switching between a low-loss state and a high-loss state, pulsed light is amplified, and the amplified pulsed light is output as seed laser light from the second FBG 15. The wavelength $\lambda 1$ of the seed laser light output from the seed laser light source 10 is 1064 nm, for example, and the pulse recurrence frequency is 100 kHz, for example.

In a case where the AOM 14 is controlled to maintain a low-loss state, seed laser light that is continuous light at the same wavelength is output from the seed laser light source 10.

At the seed laser light source 10, the output of seed laser light as pulsed light or continuous light is controlled, or the intensity of the light is controlled, as the AOM 14 is controlled by a control signal from the control unit 60.

The seed laser light output from the seed laser light source 10 is input to the optical coupler 40.

Meanwhile, the pumping light source 20 is formed with laser diodes that output pumping light, and the intensity of the output pumping light is adjusted by a control signal from the control unit 60. The pumping light source 20 outputs pumping light that puts the rare-earth element in the amplification optical fiber 30 into a pumped state, and the pumping light output from the pumping light source 20 is input to the optical coupler 40. The wavelength of the pumping light output from the pumping light source 20 is 975 nm, for example.

The optical coupler 40 includes: an input port 41 to which seed laser light from the seed laser light source 10 is input; a pumping light input port 42 to which pumping light from the pumping light source 20 is input; and an output port 43 that outputs the seed laser light from the seed laser light source 10 and the pumping light. The input port 41 is formed with a single-mode fiber that allows the seed laser light from the seed laser light source 10 to propagate as single-mode light. The pumping light input port 42 is formed with a multi-mode fiber that allows the pumping light output from the pumping light source 20 to propagate as multi-mode light. The output port 43 is formed with a double-clad fiber including a core, a clad coating the core, and a plastic clad coating the clad. The output port 43 is designed to allow the seed laser light to propagate as single-mode light through the core, and the pumping light to propagate as multi-mode light through the core and the clad. The seed laser light and the pumping light output from the output port 43 are input to the amplification optical fiber 30.

The amplification optical fiber 30 is formed with a double-clad fiber that includes: a core doped with a rare-earth element; a clad coating the core; and a plastic clad coating the clad. The core allows the seed laser light output from the optical coupler 40 to propagate as single-mode light, and the core and the clad allow the pumping light output from the optical coupler 40 to propagate as multi-mode light. When the pumping light passes through the core, the rare-earth element doped in the core is pumped. The pumped rare-earth element causes stimulated emission with the seed laser light propagating through the core. The seed laser light is amplified by the stimulated emission, and the amplified laser light is output from the amplification optical fiber 30. When the laser light output from the amplification optical fiber 30 is stopped, the level of the pumped state of the rare-earth element is not immediately lowered even if the pumping light input to the amplification optical fiber 30 is stopped, but is gradually lowered over a predetermined period of time. In the amplification optical fiber 30, the diameter of the core is 10 µm, the outer diameter of the clad is 125 µm, and the core is doped with ytterbium as the rare-earth element.

The output unit 50 outputs the laser light amplified by the amplification optical fiber 30 to the outside of the fiber laser device 100. In a case where pulsed seed laser light is output from the seed laser light source 10 as described above, the output unit 50 outputs pulsed laser light that is synchronized with the seed laser light output from the seed laser light source 10.

The output instructing unit 65 inputs an output instruction for causing the output unit 50 to output laser light, to the control unit 60.

Based on the output instruction from the output instructing unit 65, the control unit 60 controls the seed laser light source 10 and the pumping light source 20. Specifically, by controlling the laser oscillator 11 and the AOM 14 in the seed laser light source 10, the control unit 60 controls whether the seed laser light source 10 outputs seed laser light, controls the intensity of the seed laser light, and controls the seed laser light to turn into pulsed light or continuous light. Further, by controlling the pumping light source 20, the control unit 60 controls whether the pumping light source 20 outputs pumping light, and controls the intensity of the pumping light output from the pumping light source 20.

The memory 67 stores the intensity of the pumping light for causing the output unit 50 to output laser light, and the intensity of the pumping light prior to the output of the laser light from the output unit 50 (the pumping light prior to the output of the laser light will be hereinafter referred to as pre-pumping light). Referring now to FIG. 3, the intensity of the pre-pumping light is described.

FIG. 3 is a conceptual diagram showing a table stored in the memory 67 shown in FIG. 1. Specifically, FIG. 3 is a conceptual diagram showing a table indicating the relationship between the period of time T from when the laser light output from the output unit 50 is stopped till when an output instruction is input to the control unit 60 (or the point when pre-pumping light is output) and the intensity R of the pre-pumping light.

A period T1 represents the period of time from when the laser light output from the output unit 50 is stopped while the rare-earth element is in a pumped state till when the rare-earth element in the amplification optical fiber 30 returns to a state in which the rare-earth element is hardly pumped (a ground state). A period T2 is shorter than the period T1, and a period T3 is shorter than the period T2. Those periods are set in advance. Among those periods divided in the above manner, the period of time equal to or longer than the period T1 is associated with a pre-pumping light intensity R1, the period of time between T1 and T2 is associated with a pre-pumping light intensity R2, and the period of time between T2 and T3 is associated with a pre-pumping light intensity R3. In this manner, a period of time between Tn-1 and Tn is associated with a pre-pumping light intensity Rn. That is, the period T from the time when the laser light output is stopped till when the pre-pumping light is output is divided, and each of the divisional periods is associated with a pre-pumping light intensity in accordance with the duration of each corresponding period.

The period T1 is a value measured beforehand so as to fit the amplification optical fiber 30. The pre-pumping light intensity R1 is such an intensity that, in a case where the pumping light is input to the amplification optical fiber 30 for a certain period Ta while the rare-earth element in the amplification optical fiber 30 is in the ground state, the rare-earth element in the amplification optical fiber 30 is put into a predetermined pumped state at the point when the certain period Ta has elapsed. The pre-pumping light intensity R1 has a value determined beforehand so as to fit the amplification optical fiber 30. The predetermined pumped state is such a state that the gain of the amplification optical fiber 30 becomes too high to induce a parasitic oscillation even though the pre-pumping light is input for the period Ta.

The intensity R2 is determined in the following manner. First, the average pumped state of the rare-earth element during the period of time between T1 and T2 after the laser output from the amplification optical fiber 30 is stopped is measured in advance. The intensity R2 is such an intensity that, in a case where the pre-pumping light is input to the amplification optical fiber 30 in the average pumped state of the period of time between T1 and T2 for the certain period Ta, the rare-earth element in the amplification optical fiber 30 is put into a predetermined pumped state at the point when the certain period Ta has elapsed. The intensity R2 has a value determined beforehand so as to fit the amplification optical fiber 30. The predetermined pumped state is the same as the pumped state of the rare-earth element in the amplification optical fiber 30 after the intensity R1 is input for the certain period Ta.

Further, the intensity R3 and the intensities thereafter are determined in accordance with the durations of the periods shown in FIG. 3, in the same manner as the intensity R2.

As described above, in a case where the pre-pumping light is input to the amplification optical fiber for the certain period Ta, the intensity R of the pre-pumping light is determined based on the period of time T from when the laser light output from the output unit 50 is stopped till when an output instruction is input to the control unit 60, so that the rare-earth element in the amplification optical fiber 30 is put into the predetermined pumped state. When the laser light output from the amplification optical fiber 30 is stopped, the level of the pumped state of the rare-earth element becomes gradually lower over a certain period of time as described above. Therefore, as the period of time T from when the laser light output from the output unit 50 is stopped till when the pre-pumping light is output becomes longer, the intensity R of the pre-pumping light is set at a higher level. That is, in FIG. 4, the intensity R1 represents the strongest pre-pumping light. It should be noted that the intensity R1 is preferably lower than the pumping light intensity Rs in an output state. This is because, when the pumping light intensity Rs in an output state enters the amplification optical fiber 30 without seed laser light, the gain of the amplification optical fiber 30 becomes too high in a short period of time, and a parasitic oscillation is likely to occur.

A counter 69 measures the period of time from when an output instruction from the output instructing unit 65 is input to the control unit 60, the period of time from when an output instruction from the output instructing unit 65 ceases to be input to the control unit 60, and the like.

Figure 4:
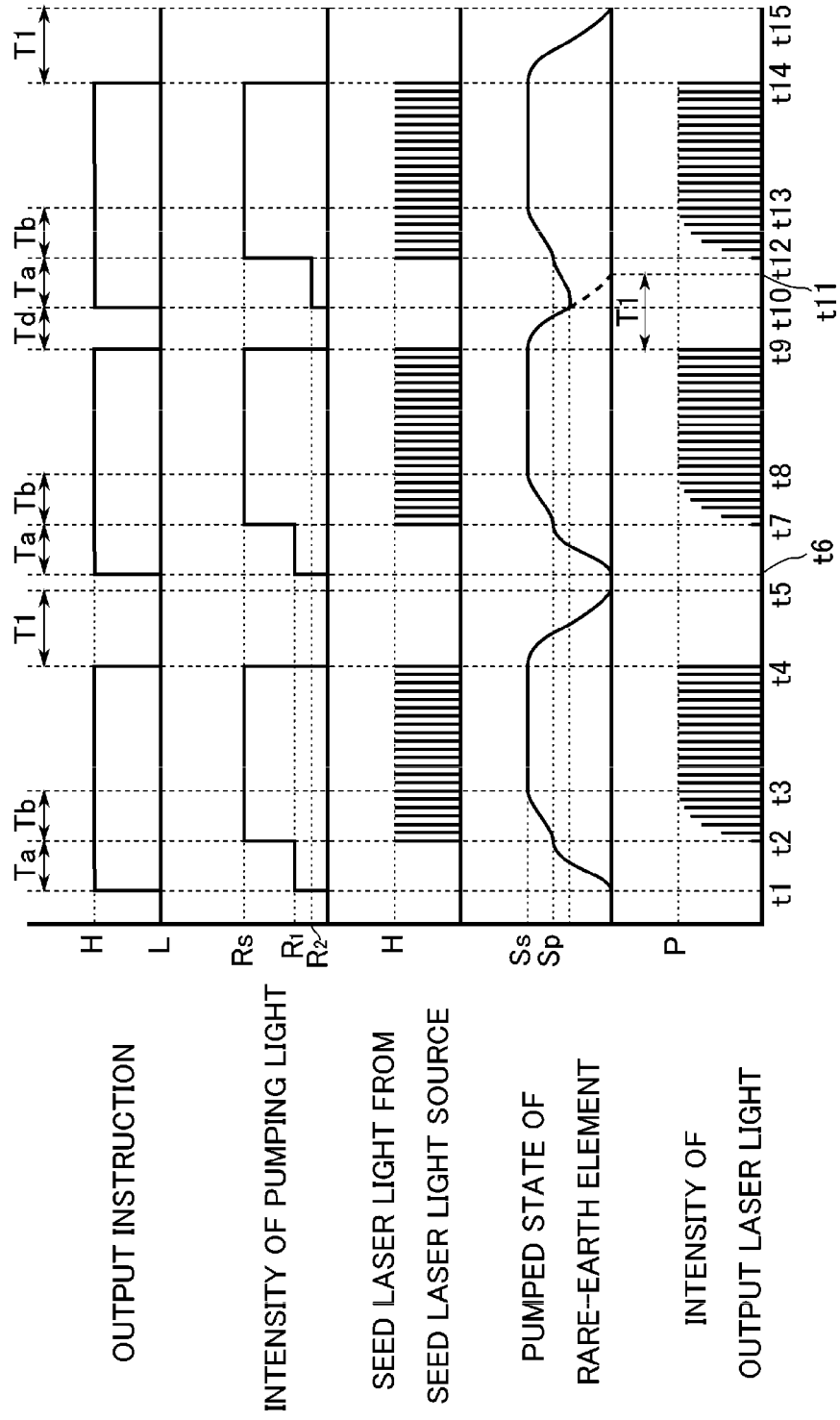
FIG. 4 is a timing chart schematically showing operations of the fiber laser device of FIG. 1.

Referring now to FIG. 4, operations of the fiber laser device 100 are described.

FIG. 4 is a timing chart schematically showing operations of the fiber laser device 100. Specifically, FIG. 4 schematically shows an output instruction input from the output instructing unit 65 to the control unit 60, the intensity of pumping light output from the pumping light source 20, the intensity of seed laser light output from the seed laser light source 10, the pumped state of the rare-earth element in the amplification optical fiber 30, and the intensity of laser light output from the output unit 50. In FIG. 4, where the output instruction is at H, the output instructing unit 65 is issuing the output instruction to the control unit 60. Where the intensity of the pumping light is higher, the pumping light source 20 is outputting pumping light with a higher intensity. Where the intensity of the seed laser light from the seed laser light source is higher, the seed laser light source 10 is outputting seed laser light with a higher intensity. Where the level of the pumped state of the rare-earth element is higher, the rare-earth element in the amplification optical fiber 30 is in a pumped state at a higher level. Where the intensity of the output laser light is higher, the output unit 50 is outputting laser light with a higher intensity.

First, a power supply (not shown) for the fiber laser device 100 is switched on, to supply power to the control unit 60. Supplied with power, the control unit 60 awaits an output instruction from the output instructing unit 65.

At time t1, an output instruction is input from the output instructing unit 65 to the control unit 60. The control unit 60 then controls the seed laser light source 10 and the pumping light source 20 so that the seed laser light source 10 and the pumping light source 20 enter a pre-pumped state. The output instruction at time t1 is the first output instruction issued after the power supply to the fiber laser device 100 is switched on. As described above, the memory 67 stores the relationship between the period of time T from when the laser light output from the output unit 50 is stopped till when an output instruction is input to the control unit 60 (the period of time from when the laser light output from the output unit 50 is stopped till when pre-pumping light is output) and the pre-pumping light intensity R. The pre-pumping light intensity R1 is the intensity associated with the case where the period of time from when the laser light output from the output unit 50 is stopped till when an output instruction is input to the control unit 60 is equal to or longer than the period of time T1 from when the laser light output from the output unit 50 is stopped till when the rare-earth element in the amplification optical fiber 30 returns to a ground state. In view of this, in the case of the first output instruction after the power supply is switched on, the control unit 60 considers the rare-earth element in the amplification optical fiber 30 to be in the ground state, and reads the pre-pumping light intensity R1 from the memory 67. The control unit 60 then controls the pumping light source 20 to output pre-pumping light with the intensity R1 read from the memory 67 for the predetermined period Ta that is determined beforehand with the use of a signal from the counter 69. The control unit 60 further controls the seed laser light source 10 not to output seed laser light. It should be noted that the controlling the seed laser light source 10 includes issuing no instructions to the seed laser light source 10. In the above manner, the level of the pumped state of the rare-earth element in the amplification optical fiber 30 is made gradually higher. At the point (time t2) when the pre-pumped state comes to an end as the certain period Ta has elapsed from time t1, the pumped state of the rare-earth element is a predetermined pumped state Sp. The pre-pumping light intensity R1 at this point is 2 W, for example, and the certain period Ta is 100 μs, for example. The time when the laser light output from the output unit 50 is stopped is the time when the pumping light from the pumping light source 20 ceases to enter the amplification optical fiber 30.

At time t2 when the predetermined certain period Ta has elapsed from time t1, the control unit 60 controls the seed laser light source 10 and the pumping light source 20 to enter an output state. The control unit 60 then controls the pumping light source 20, so that the pumping light source 20 outputs pumping light with a predetermined intensity Rs. The control unit 60 further controls the seed laser light source 10, so that the seed laser light source 10 outputs pulsed seed laser light having an intensity H as the crest value and the wavelength λ1. The intensity Rs of the pumping light and the intensity H as the crest value of the seed laser light are such intensities that laser light is output from the output unit 50. Specifically, the intensity Rs of the pumping light in the output state is 6 W, for example, and the intensity H as the crest value of the seed laser light is 4 W, for example.

In the output state, the pumping light with the intensity Rs is output from the pumping light source 20, and the pulsed seed laser light is output from the seed laser light source 10. The rare-earth element in the amplification optical fiber 30 is then pumped to an even higher level, and causes stimulated emission, to amplify the intensity of the seed laser light. As a result, amplified pulsed laser light is output from the amplification optical fiber 30, and the amplified pulsed laser light is output from the output unit 50.

At a point immediately after time t2, however, the intensity of the laser light output from the output unit 50 has not yet reached a predetermined intensity P. At time t3 when a period Tb has elapsed from time t2, the pumped state of the rare-earth element is represented by Ss. In this manner, laser light with the predetermined intensity P is output, and the laser light output is stabilized. The period Tb from time t2 to time t3 is the rise time of the laser light that is output from the output unit 50. For example, in the case of the first laser light output after the power supply is switched on, the period Tb is 50 μs or shorter, where the intensity R1 of the pre-pumping light is 2 W, the certain period Ta is 100 μs, the intensity Rs of the pumping light in the output state is 6 W, and the intensity H as the crest value of the seed laser light is 4 W as described above.

At time t4, the input of the output instruction from the output instructing unit 65 is stopped. The control unit 60 then stops the output of the seed laser light from the seed laser light source 10 and the output of the pumping light from the pumping light source 20. As a result, the output of the laser light from the output unit 50 is stopped. In this manner, the output state comes to an end. The control unit 60 again awaits an output instruction from the output instructing unit 65.

As shown in FIG. 4, the level of the pumped state of the rare-earth element in the amplification optical fiber 30 becomes gradually lower after time t4 when the output state comes to an end, and the rare-earth element enters the ground state at time t5 when the period T1 has elapsed from time t4.

At time t6, an output instruction is input from the output instructing unit 65 to the control unit 60. The control unit 60 then controls again the seed laser light source 10 and the pumping light source 20 to enter an output state. At this point, the control unit 60 calculates the period of time from time t4 at which the output state comes to an end till time t6 at which the output instruction is input, using a signal from the counter 69. The period of time from time t5 to time t6 is compared with the period of time T from when the laser light output from the output unit 50 is stopped till when an output instruction is input to the control unit 60. The period of time T is stored in the memory 67.

As shown in FIG. 4, time t6 at which the output instruction is input is later than time t5 when the rare-earth element in the amplification optical fiber 30 enters a state (a ground state) in which the rare-earth element is hardly pumped, and the period from time t5 to time t6 is longer than the period T1. Accordingly, the control unit 60 reads the pre-pumping light intensity R1 associated with the period T1 or longer from the memory 67. The control unit 60 then controls the pumping light source 20 to be in a pre-pumped state and to output pre-pumping light with the intensity R1 for the certain period Ta that is determined beforehand with the use of a signal from the counter 69.

After that, at time t7 when the certain period Ta has elapsed from time t6 and the pre-pumped state comes to an end, the pumped state of the rare-earth element is switched to the predetermined state Sp, which is the same as the pumped state at time t2. At time t7, the control unit 60 controls the seed laser light source 10 and the pumping light source 20 to be in an output state, so that laser light is output from the seed laser light source 10 and pumping light with the predetermined intensity Rs is output from the pumping light source 20. In this manner, amplified pulsed laser light is output from the output unit 50.

At this point, laser light rises during the period from time t7 to time t8, like the laser light during the period from time t2 to time t3. The period of time from time t7 to time t8 as the rise time of laser light is the same as the period Tb from time t2 to time t3, since the pumped state of the rare-earth element in the amplification optical fiber 30 at time t7 is the same as the pumped state of the rare-earth element at time t2. Accordingly, at time t8, laser light with the predetermined intensity P is output from the output unit 50.

At time t9, the input of the output instruction from the output instructing unit 65 is stopped. The control unit 60 then stops the output of the seed laser light from the seed laser light source 10 and the output of the pumping light from the pumping light source 20. As a result, the output of the laser light from the output unit 50 is stopped.

At time t10, an output instruction is again input from the output instructing unit 65 to the control unit 60. The control unit 60 then controls again the seed laser light source 10 and the pumping light source 20 to enter an output state. At this point, the control unit 60 calculates the period of time from time t9 at which the output state comes to an end till time t10 at which the output instruction is input, using a signal from the counter 69. The period Td from time t9 to time t10 is then compared with the period T according to the table stored in the memory 67.

As shown in FIG. 4, the output instruction is input to the control unit 60 at time t10, which is earlier than time t11 when the period T1 has elapsed from an end of laser output. FIG. 4 shows a case where the duration of the period Td from time t9 to time t10 is equivalent to the duration of the period of time between T1 and T2 in the memory 67. In this case, the control unit 60 reads the pre-pumping light intensity R2 based on T1 to T2 from the memory 67. The control unit 60 then controls the pumping light source 20 to output pre-pumping light with the intensity R2 for the certain period Ta, using a signal from the counter 69. The control unit 60 also controls the seed laser light source 10 not to output seed laser light. The intensity R2 of this pre-pumping light is lower than the intensity R1 of the pre-pumping light during the period from time t6 to time t7.

As described above, pre-pumping light with the intensity R2 is input to the amplification optical fiber 30. Therefore, the level of the pumped state of the rare-earth element in the amplification optical fiber 30, which has started becoming lower, is again made gradually higher. After that, at time t12 when the certain period Ta has elapsed from time t9 and the pre-pumped state comes to an end, the pumped state of the rare-earth element is switched to the predetermined pumped state Sp, which is the same as the pumped state at time t2 (t7).

At time t12, the control unit 60 controls the seed laser light source 10 and the pumping light source 20 to be in an output state, so that predetermined laser light is output from the seed laser light source 10 and predetermined pumping light is output from the pumping light source 20. In this manner, amplified pulsed laser light is output from the output unit 50. At this point, laser light rises during the period from time t12 to time t13, like the laser light during the period from time t2 (t7) to time t3 (t8). The period of time from time t12 to time t13 as the rise time of laser light is the same as the period Tb from time t2 to time t3 (from t7 to t8), since the pumped state of the rare-earth element in the amplification optical fiber 30 at time t12 is the same as the pumped state of the rare-earth element at time t2 (t7). Accordingly, at time t13, laser light with the predetermined intensity P is output from the output unit 50.

When the input of the output instruction to the control unit 60 is stopped at time t14, the output of the laser light from the output unit 50 is stopped. At time 15, the rare-earth element in the amplification optical fiber 30 enters a ground state.

In the fiber laser device 100 according to this embodiment, when an output instruction is input from the output instructing unit 65 to the control unit 60, the control unit 60 controls the seed laser light source 10 and the pumping light source 20 to be in a pre-pumped state, so that pumping light is input to the amplification optical fiber 30 for the certain period Ta, and the rare-earth element in the amplification optical fiber is pumped. The control unit 60 then puts the pumping light source 20 and the seed laser light source 10 into an output state, so that pumping light and seed laser light are input to the amplification optical fiber 30. As described above, in a pre-pumped state, the rare-earth element in the amplification optical fiber 30 is pumped, and seed laser light and pumping light are input to the amplification optical fiber 30 in that state. Accordingly, the rise time Tb of laser light output from the output unit in an output state can be shortened.

The intensity of pumping light in a pre-pumped state is determined based on the period of time from time t4 (t9) when the output state prior to the input of an output instruction to the control unit 60 comes to an end till time t6 (t10) when the output instruction is input to the control unit 60. As for the intensity determined based on the period of time from when the output state prior to the input of an output instruction to the control unit comes to an end till when the output instruction is input to the control unit, pre-pumping light is set at the higher intensity R1 in a case where an output instruction is input to the control unit 60 after a sufficiently long period of time has elapsed from time t4 when the output state prior to the input of the output instruction to the control unit 60 comes to an end, and the pre-pumping light is set at the lower intensity R2 than the intensity R1 in a case where an output instruction is input to the control unit 60 shortly after time t9 when the output state prior to the input of the output instruction to the control unit 60 comes to an end.

That is, in a case where the level of the pumped state of the rare-earth element in the amplification optical fiber 30 is low at time t6 (t10) when a pre-pumped state starts, the intensity of pumping light is high. In a case where the level of the pumped state of the rare-earth element in the amplification optical fiber 30 is high at time t6 (t10), the intensity of pumping light is low. In this manner, the intensity of pumping light is determined in accordance with the pumped state of the rare-earth element in the amplification optical fiber 30, and the pumping light is input to the amplification optical fiber 30 for the certain period Ta. Accordingly, the rare-earth element enters the predetermined pumped state Sp at time t7 (t12) when an output state starts. As described above, laser light and pumping light are input to the amplification optical fiber 30 in a predetermined pumped state. Accordingly, the period Tb until the time when laser light output from the output unit 50 rises can be restricted from varying.

Further, in the fiber laser device 100, a pre-pumped state lasts for the certain period Ta after an output instruction is input from the output instructing unit 65, and the laser light that is output from the output unit 50 rises during the period Tb, which is restricted from varying. That is, regardless of the duration of the period from time t4 (t9) when the output state prior to the input of an output instruction to the control unit 60 comes to an end until time t6 (t10) when the output instruction is input to the control unit 60, the laser light is stabilized after a certain period of time (Ta+Tb) from when the output instruction is input to the output instructing unit 65. Since variations are restrained during this period (Ta+Tb), the fiber laser device 100 excels in operability.

In this embodiment, the intensity P of output laser light is constant. However, in a fiber laser device in which the intensity P of laser light that is output in response to each output instruction varies, the intensity of pre-pumping light is preferably controlled so that the level of the pumped state of the rare-earth element in the amplification optical fiber 30 is constant at the time (t2, t7, or t12 in FIG. 3, for example) when the output of laser light is started. A constant pumped state in a case where the intensity of laser light output in response to each output instruction varies is such a state that the ratio Sp/Ss between the pumped state Sp at the time when an output state starts and the pumped state Ss at the time when the laser light has risen and is stabilized, becomes a predetermined constant value. It should be noted that Sp/Ss is preferably 1 or lower so that the gain of the amplification optical fiber 30 does not become too high and induce a parasitic oscillation, and the crest value of the output pulsed light at the time of the start of an output state does not become greater than the crest value of the pulse after the rise. To perform such control, the relationships among the intensity of the previous output light, the period of time T from when this output is stopped till when an output instruction is input to the control unit 60, the intensity of the next output light designated by the output instruction, and the intensity R of pre-pumping light are calculated in advance, so that Sp/Ss becomes a constant value where the predetermined pre-pumped state period is the period Ta. The table showing the relationships among those parameters is stored beforehand into the memory 67. In this manner, the above described control can be performed.

(Second Embodiment)

Figure 5:
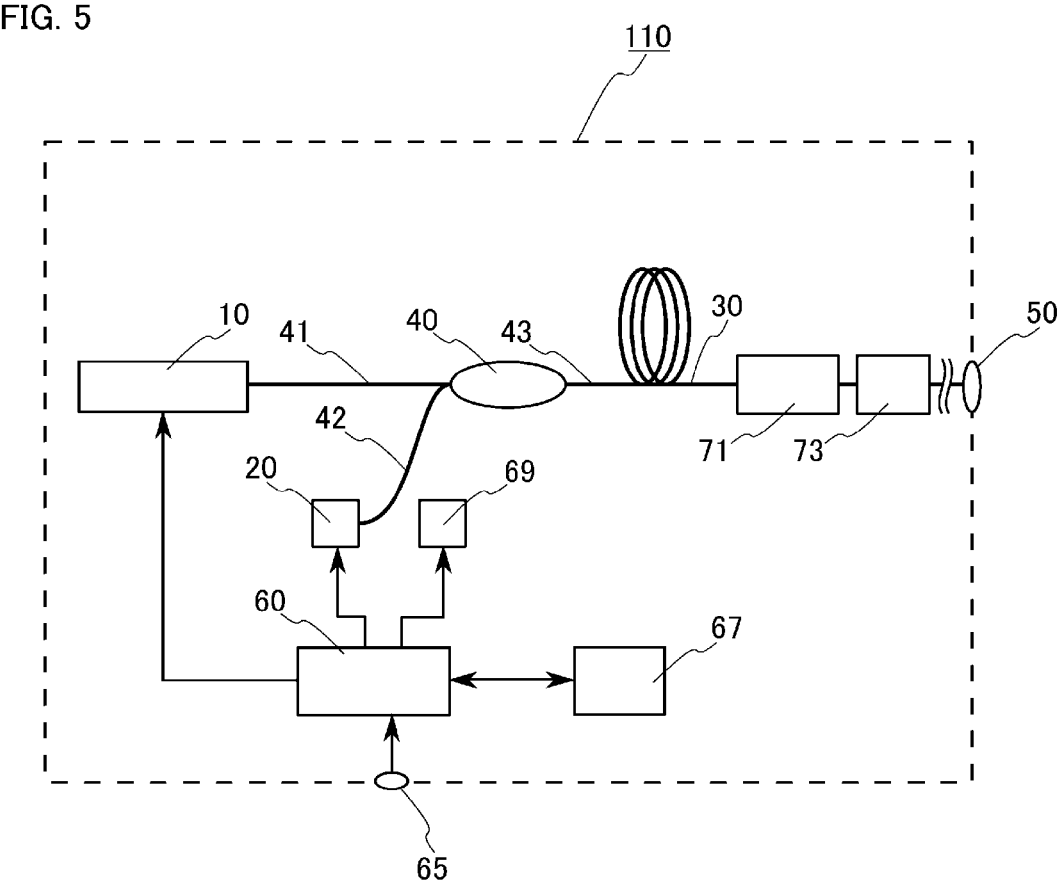
FIG. 5 is a diagram showing a fiber laser device according to a second embodiment of the invention.

Referring now to FIG. 5, a second embodiment of the invention is described in detail. It should be noted that components that are identical or similar to those in the first embodiment are denoted by the same reference numerals as those used in the first embodiment, and the same explanation will not be repeated. FIG. 5 is a diagram showing a fiber laser device according to the second embodiment of the invention.

As shown in FIG. 5, a fiber laser device 110 differs from the first embodiment in including: a wavelength converter 71 that is provided between the amplification optical fiber 30 and the output unit 50, and receives light that is output from the amplification optical fiber 30; and an optical filter 73 that is provided between the wavelength converter 71 and the output unit 50, and receives light that is output from the wavelength converter 71.

The wavelength converter 71 is formed with an optical fiber that causes stimulated Raman scattering. In a case where the crest value of the intensity of input light is greater than a predetermined threshold value, the wavelength converter 71 converts the input light into a longer-wavelength light, and then outputs the longer-wavelength light. In a case where the crest value of the intensity of input light is smaller than the predetermined threshold value, the wavelength converter 71 does not convert the wavelength of input light, and outputs the light as it is. Specifically, when pre-pumping light is input from the pumping light source 20 to the amplification optical fiber 30 in a pre-pumped state, the amplification optical fiber 30 generates spontaneous emission light. This spontaneous emission light is amplified by the amplification optical fiber 30, and is output. The spontaneous emission light is then input to the wavelength converter 71. However, the crest value of the intensity of the light that is output from the amplification optical fiber 30 at this point is smaller than the predetermined threshold value, and therefore, the wavelength converter 71 does not perform wavelength conversion. In an output state, on the other hand, seed laser light is output from the seed laser light source 10, and pumping light is output from the pumping light source 20. The amplification optical fiber 30 amplifies the seed laser light, and outputs laser light. The laser light is then input to the wavelength converter 71. Since the crest value of the intensity of the laser light that is input at this point is greater than the predetermined threshold value, the wavelength converter 71 performs wavelength conversion.

When laser light with a wavelength $\lambda 1$ is input to the wavelength converter 71, the wavelength converter 71 uses stimulated Raman scattering to convert the input light into light with a wavelength $\lambda 2$ that is longer than the wavelength $\lambda 1$. Therefore, light with a longer wavelength than that of the input light is output from the wavelength converter 71.

Examples of optical fibers for such wavelength conversions include an optical fiber that is formed with a core and a clad, with the core being doped with a dopant that increases a nonlinear optical constant. Examples of such dopants include germanium and phosphorus. For example, the wavelength converter 71 is a single-mode fiber that has a core doped with 7 to 8 mass percent of germanium. The diameter of the core is 5 μm, and the length of the single-mode fiber is 20 m. When the intensity as the crest value of pulsed light is 70 W or higher, and light with the wavelength $\lambda 1$ of 1064 nm is input, the wavelength converter 71 outputs light with the wavelength $\lambda 2$ of 1120 nm. When light with an intensity of 70 W or lower is input, the wavelength converter 71 does not perform wavelength conversion. The threshold value of the crest value in wavelength conversions by the wavelength converter 71 can be changed with the diameter of the core, the density of the dopant to be added, the length, or the like. Therefore, the diameter of the core, the density of the dopant to be added, and the length of the wavelength converter 71 of this embodiment are set so that wavelength conversion is performed when the crest value of light with a wavelength of 1120 nm is larger than 70 W, and no wavelength conversions are performed when the crest value is smaller than that. On the other hand, in a case where the diameter of the core, the density of the dopant to be added, and the length of the wavelength converter 71 are determined in advance, the outputs of the seed laser light source 10 and the pumping light source 20 are set to achieve a crest value of input light such that no wavelength conversions are performed in a pre-pumped state, but wavelength conversion is performed in an output state.

In a case where laser light with a wavelength that is output from the seed laser light source 10 is input via the wavelength converter 71, the optical filter 73 passes input laser light that has its wavelength converted by the wavelength converter 71, but restrains transmission of input laser light that does not have its wavelength converted by the wavelength converter 71. Accordingly, in a case where laser light with a high intensity is output from the amplification optical fiber 30, and the wavelength of the laser light is converted by the wavelength converter 71, the laser light that is input to the optical filter 73 passes through the optical filter 73. On the other hand, in a case where laser light with a low intensity is output from the amplification optical fiber 30, and the wavelength of the laser light is not converted by the wavelength converter 71, transmission of the laser light that is input to the optical filter 73 is restrained by the optical filter 73.

The optical filter 73 is formed with a dielectric multilayer filter, a photonic bandgap fiber, or the like. For example, in a case where laser light with the wavelength $\lambda 1$ of 1064 nm is input to the wavelength converter 71, and is wavelength-converted by the wavelength converter 71 into laser light with the wavelength $\lambda 2$ of 1120 nm to be input to the optical filter 73, the laser light passes through the optical filter 73. On the other hand, in a case where laser light with the wavelength $\lambda 1$ of 1064 nm is input to the wavelength converter 71, and the laser light of 1064 nm is input to the optical filter 73 as it is without the wavelength conversion by the wavelength converter 71, transmission of the laser light is restrained by the optical filter 73.

Next, operations of the fiber laser device 110 are described.

In the fiber laser device 110, pre-pumping light is output from the pumping light source 20 for a certain period Ta (t1 to t2, t6 to t7, and t10 to t12) in a pre-pumped state. The intensity of the pre-pumping light is determined based on the period of time from time t4 (t9) when the output state prior to the input of an output instruction to the control unit 60 comes to an end till time t6 (t10) when the output instruction is input to the control unit 60.

At this point, the pre-pumping light that is input to the amplification optical fiber 30 causes the amplification optical fiber 30 to generate spontaneous emission light. This spontaneous emission light is amplified by the amplification optical fiber 30, and is output. The spontaneous emission light is then input to the wavelength converter 71. However, the light that is output from the amplification optical fiber 30 has a smaller crest value than the threshold crest value for wavelength conversions by the wavelength converter 71, and therefore, is not subjected to the above described wavelength conversion at the wavelength converter 71. Accordingly, transmission of the light that is input from the wavelength converter 71 to the optical filter 73 is restrained by the optical filter. As a result, light is not output from the output unit 50 in the pre-pumped state.

In a case where the wavelength converter 71 is a 20-m long single-mode fiber, the core is made of quartz doped with 7 to 8 mass percent of germanium, and the diameter of the core is 5 μm as described above, the light that is amplified and output by the amplification optical fiber 30 and is input to the wavelength converter 71 does not have its wavelength converted by the wavelength converter 71 when the intensity R1 of the pre-pumping light is 2 W, for example, since the crest value of the light is smaller than the threshold crest value for wavelength conversions by the wavelength converter 71.

Next, in the period (t2 to t4, t7 to t9, and t12 to t14) during which the pumping light source and the seed laser light source are put into an output state, pumping light with an intensity Rs is output from the pumping light source 20, and pulsed seed laser light that has an intensity H as its crest value and has a wavelength λ1 is output from the seed laser light source 10. The laser light that is output from the amplification optical fiber 30 at this point has a larger crest value than the threshold crest value for wavelength conversions by the wavelength converter 71, and therefore, has its wavelength converted by the wavelength converter 71. Accordingly, the laser light that is input from the wavelength converter 71 to the optical filter 73 passes through the optical filter, and is output from the output unit 50. For example, in a case where the wavelength converter 71 is a 20-m long single-mode fiber, the core is made of quartz doped with 7 to 8 mass percent of germanium, and the diameter of the core is 5 μm as described above, the crest value of the laser light that is input to the wavelength converter 71 is 185 W, and the wavelength of the laser light is converted, if the intensity Rs of the pumping light in the output state is 6 W, and the intensity H as the crest value of the seed laser light is 4 W.

In the above described fiber laser device 110, when laser light that is amplified by the amplification optical fiber 30 is output in an output state, the wavelength of the laser light is converted by the wavelength converter 71. The laser light having its wavelength converted by the wavelength converter 71 is input to the optical filter 73. The laser light then passes through the optical filter 73, and is output from the output unit 50. In a pre-pumped state, on the other hand, the rare-earth element in the amplification optical fiber 30 is pumped by pre-pumping light. The amplification optical fiber 30 is designed so that seed laser light output from the seed laser light source 10 is amplified through stimulated emission from the rare-earth element that is pumped by pumping light. In the pre-pumped state, however, the seed laser light is not input to the amplification optical fiber 30. Accordingly, only spontaneous emission light generated by the pumped rare-earth element is output from the amplification optical fiber. This spontaneous emission light has a great spectrum width and a low intensity as its crest value. Even when the light obtained by amplifying the spontaneous emission light is input from the amplification optical fiber 30 in the pre-pumped state, the wavelength converter 71 does not perform wavelength conversion. Accordingly, even in a case where light obtained by amplifying the spontaneous emission light is output from the amplification optical fiber, transmission of light that is output from the wavelength converter 71 and is input to the optical filter 73 is restrained by the optical filter 73. In this manner, in the pre-pumped state, the output unit 50 can be restrained from outputting unnecessary light.

In this embodiment, at time t4, the control unit 60 stops the output of seed laser light from the seed laser light source 10 and the output of pumping light from the pumping light source 20, as in the first embodiment. However, in the period from time t4 to time t6, the seed laser light source 10 may output seed laser light, and the pumping light source 20 may output pumping light. However, the output intensity of the seed laser light from the seed laser light source 10 and the output intensity of the pumping light from the pumping light source 20 are lower than the crest value at which the wavelength of light that is input to the wavelength converter 71 is converted by the wavelength converter 71. Since the output intensity of the seed laser light from the seed laser light source 10 and the output intensity of the pumping light from the pumping light source 20 are set as above, laser light is not output from the output unit 50 in the period from time t4 to time t6. As the output from the seed laser light source 10 and the pumping light source 20 is not completely stopped as above, the seed laser light source 10 and the pumping light source 20 can perform more stable operations. As the seed laser light is output as described above, the seed laser light can rise more quickly at the time of laser light output than in a case where the output of the seed laser light is stopped. At this point, the AOM 14 in the seed laser light source 10 may be controlled so that the seed laser light that is output from the seed laser light source 10 becomes continuous light or pulsed light. In a case where the seed laser light is pulsed light, the mean intensity of the seed laser light is the same as the intensity of the seed laser light that is output with a stationary pulse, but the crest value is preferably adjusted to such a value that the wavelength converter 71 performs no wavelength conversions.

Further, in this embodiment, the wavelength converter 71 is formed with an optical fiber that causes stimulated Raman scattering. However, this wavelength converter is not necessarily an optical fiber, as long as this wavelength converter has the function to convert the wavelength of input light into a different wavelength and output the wavelength-converted light when the crest value of the intensity of the input light is large, and the function not to convert the wavelength of input light but to output the light as it is when the crest value of the intensity of the input light is small. For example, the wavelength converter 71 may be a nonlinear optical crystal such as lithium triborate ($LoB_3O_5$) that generates second harmonics. Such a nonlinear optical crystal outputs the second harmonics (light with a ½ wavelength) when light with an intensity equal to or higher than a predetermined crest value is input. In a case where a nonlinear optical crystal that generates the second harmonics is used as the wavelength converter 71, a filter that passes the wavelength of the second harmonics is used as the optical filter 73, with transmission of the wavelength of light input to the wavelength converter 71 being restrained.

(Third Embodiment)

Figure 6:
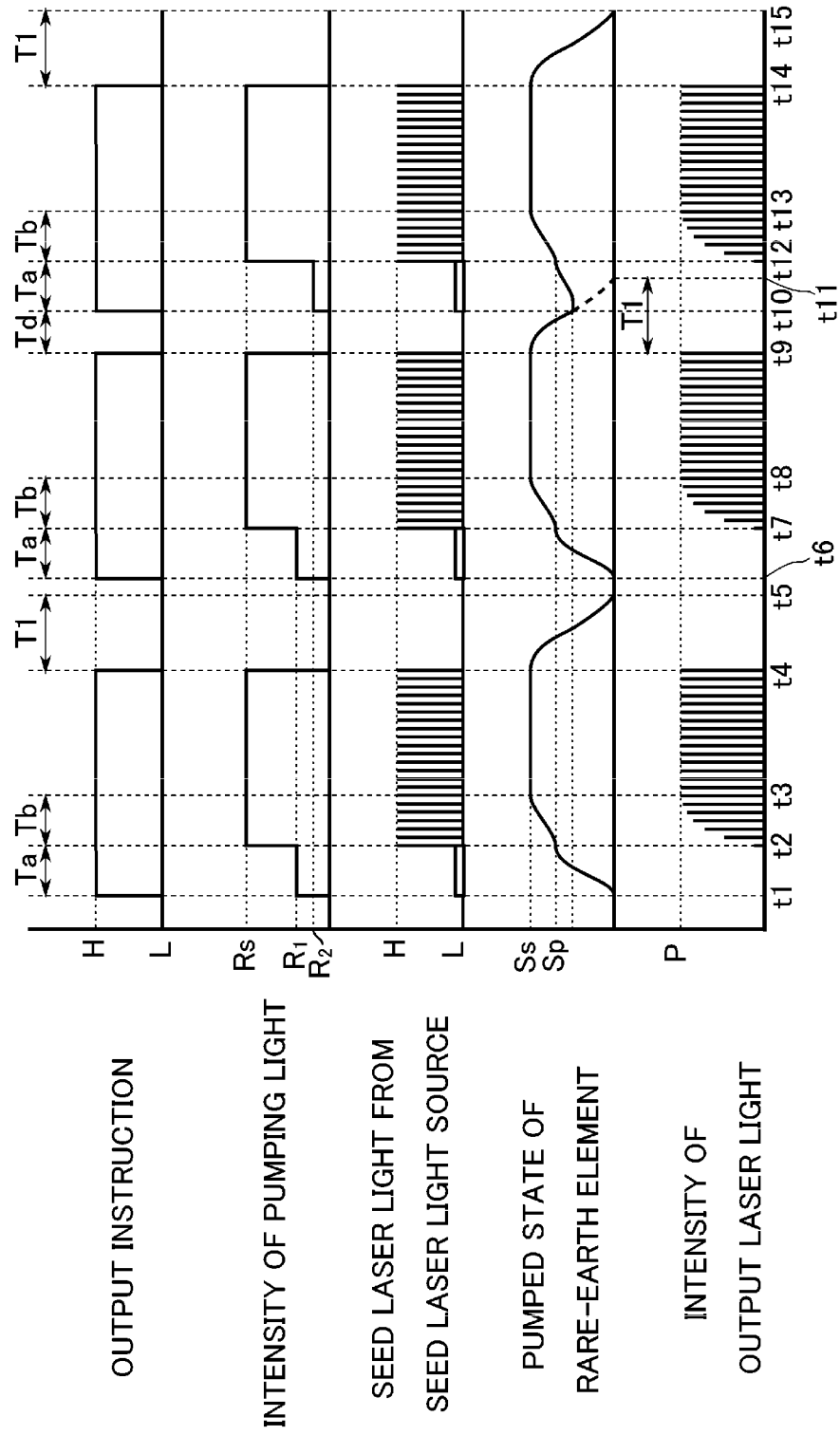
FIG. 6 is a timing chart schematically showing operations of a fiber laser device according to a third embodiment of the invention.

Referring now to FIG. 6, a third embodiment of the invention is described in detail. It should be noted that components that are identical or similar to those in the second embodiment are denoted by the same reference numerals as those used in the second embodiment, and the same explanation will not be repeated. This embodiment is a fiber laser device using the fiber laser device 110 described in the second embodiment.

FIG. 6 is a timing chart illustrating operations of the fiber laser device 110 according to the third embodiment of the invention. The fiber laser device 110 of this embodiment differs from the fiber laser device 110 of the second embodiment in that, in a pre-pumped state, pre-pumping light is output from the pumping light source 20, and weak seed laser light is output from the seed laser light source 10.

Specifically, as shown in FIG. 5, at time t1 (t6, t12), an output instruction is input from the output instructing unit 65 to the control unit 60. The control unit 60 then controls the seed laser light source 10 and the pumping light source 20 to enter a pre-pumped state. The control unit 60 reads a pre-pumping light intensity R1 (R2) from the memory 67, and controls the pumping light source 20 to output pre-pumping light with the intensity R1 (R2) read from the memory 67 for a certain period Ta that is determined beforehand with the use of a signal from the counter 69. The control unit 60 further controls the seed laser light source 10 to output weak seed laser light with a predetermined constant intensity L in the pre-pumped state.

Pumping light that is output from the pumping light source 20, and the weak seed laser light that is output from the seed laser light source are input to the amplification optical fiber 30. In the amplification optical fiber 30, the weak seed laser light is amplified by emission stimulated by the seed laser light. The seed laser light is then output from the amplification optical fiber 30, and is input to the wavelength converter 71. However, even when the seed laser light that has been amplified and output by the amplification optical fiber 30 is input to the wavelength converter 71, the wavelength converter 71 does not convert the wavelength of the input light. For example, in a case where the wavelength converter 71 is a 20-m long single-mode fiber, the core is made of quartz doped with 7 to 8 mass percent of germanium, and the diameter of the core is 5 μm as described above, the intensity L of the weak seed laser light in the pre-pumped state is 1 W. If the intensity of the pre-pumping light is 2 W, the wavelength converter 71 does not perform wavelength conversion.

In the fiber laser device 110 according to this embodiment, seed laser light is input to the amplification optical fiber 30 in the pre-pumped state. Accordingly, pumping of the rare-earth element by the pumping light and relaxing of the rare-earth element by the seed laser light can be balanced. Thus, the rare-earth element is not so pumped as to be unstable, and unintended laser oscillations can be restrained in the pre-pumped state.

Further, in the pre-pumped state, the weak seed laser light is amplified by the stimulated emission from the amplification optical fiber 30, and light with the wavelength λ1 is output. In the pre-pumped state, however, the light that is output from the amplification optical fiber 30 does not have its wavelength converted by the wavelength converter 71. Accordingly, transmission of the laser light that is input from the wavelength converter 71 to the optical filter 73 is restrained by the optical filter 73. In this manner, outputting unnecessary laser light can be restrained in the pre-pumped state.

Although the invention has been described with reference to the first, second, and third embodiments as examples, the invention is not limited to them.

For example, in the first embodiment, the control unit 60 controls the seed laser light source 10 not to output laser light in the pre-pumped state. However, the invention is not limited to that. For example, in the pre-pumped state, the control unit 60 may control the seed laser light source 10 to output weak seed laser light. With this arrangement, the seed laser light is input to the amplification optical fiber 30 in the pre-pumped state. Accordingly, pumping of the rare-earth element by the pumping light and relaxing of the rare-earth element by the seed laser light can be balanced. Thus, the rare-earth element is not so pumped as to be unstable, and unintended laser oscillations can be restrained in the pre-pumped state.

In this case, the pumping light and the weak seed laser light are input to the amplification optical fiber 30 in the pre-pumped state. Accordingly, laser light that is generated by amplifying the weak seed laser light is output from the amplification optical fiber 30. However, the intensity of the weak seed laser light that is input to the amplification optical fiber 30 is very low. Therefore, the laser light that is output from the amplification optical fiber 30 is also weak, and does not present any problem in operating the fiber laser device 100.

Further, in the first, second, and third embodiments, a laser output device of a Fabry-Perot type is used as the seed laser light source 10. However, a laser output device of a fiber ring type may also be used. Further, the seed laser light that is output from the seed laser light source 10 in the output state is pulsed light in the above embodiments. However, the seed laser light may be continuous light.

Further, in the first, second, and third embodiments, the intensity of the pumping light that is output from the pumping light source 20 in the pre-pumped state is lower than the intensity of the pumping light that is output from the pumping light source 20 in the output state. However, the invention is not limited to that. For example, the pumping light that is output from the pumping light source 20 in the pre-pumped state may have the same intensity as the intensity of the pumping light that is output from the pumping light source 20 in the output state, as long as the laser light rise period Tb does not vary. In this case, the pumping light source 20 should be put into the same state between the output preparing state and the output state. Accordingly, the load on the control unit can be reduced.

Further, the amplification optical fiber 30 allows laser light to propagate as single-mode light in the above embodiments. However, the amplification optical fiber 30 may be capable of allowing multi-mode light to propagate.

Further, as long as the output instructing unit 65 can input an output instruction to the control unit 60, the output instruction may be generated outside the fiber laser device, and be input to the control unit 60 via the output instructing unit 65.

Industrial Applicability

According to the invention, a fiber laser device capable of restraining variations of the rise time of output laser light while shortening the rise time of the output laser light can be provided.

DESCRIPTION OF REFERENCE NUMERALS

10 . . . seed laser light source
11 . . . pumping light source
12 . . . first FBG
13 . . . rare-earth doped fiber
14 . . . AOM
15 . . . second FBG
20 . . . pumping light source
30 . . . amplification optical fiber
40 . . . optical coupler
50 . . . output unit
60 . . . control unit
65 . . . output instructing unit
67 . . . memory
71 . . . wavelength converter
73 . . . optical filter

The invention claimed is:

1. A fiber laser device comprising:
a seed laser light source configured to output seed laser light;
a pumping light source configured to output pumping light;
an amplification optical fiber configured to receive the seed laser light and the pumping light, amplify the seed laser light, and output the seed laser light as laser light, the amplification optical fiber being doped with a rare-earth element, the rare-earth element being pumped by the pumping light;
an output unit configured to output the laser light output from the amplification optical fiber;
a control unit configured to control at least the seed laser light source and the pumping light source, and control an intensity of the pumping light output from the pumping light source; and
an output instructing unit configured to input an output instruction to the control unit, the output instruction causing the output unit to output the laser light,
wherein,
when the output instruction is input to the control unit, the control unit controls the seed laser light source and the pumping light source to initiate a pre-pumped state and switch from the pre-pumped state to an output state, and the control unit calculates a duration of time between an end time of a previous output state and the time when the output instruction is input to the control unit, wherein in the pre-pumped state, the seed laser light source does not output the seed laser light while the pumping light source outputs the pumping light for a predetermined period of time, in the output state, the seed laser light source outputs the seed laser light, and the pumping light source outputs the pumping light, to cause the output unit to output the laser light, and wherein in the pre-pumped state, the control unit sets the intensity of the pumping light output from the pumping light source according to the calculated duration of time.

2. The fiber laser device according to claim 1, further comprising:

a wavelength converter provided between the amplification optical fiber and the output unit and configured to perform no wavelength conversions on light generated and output from the amplification optical fiber by the pumping light in the pre-pumped state, and to perform wavelength conversion on the laser light output from the amplification optical fiber by the seed laser light and the pumping light in the output state; and an optical filter provided between the wavelength converter and the output unit, and configured, when light in the same wavelength band as the seed laser light is input to the wavelength converter, to pass light having a wavelength thereof converted by the wavelength converter, and to restrain transmission of light not having a wavelength thereof converted by the wavelength converter.

3. A fiber laser device comprising:

a seed laser light source configured to output seed laser light;

a pumping light source configured to output pumping light;

an amplification optical fiber configured to receive the seed laser light and the pumping light, amplify the seed laser light, and output the seed laser light as laser light, the amplification optical fiber being doped with a rare-earth element, the rare-earth element being pumped by the pumping light;

an output unit configured to output the laser light output from the amplification optical fiber;

a control unit configured to control at least the seed laser light source and the pumping light source, and control an intensity of the pumping light output from the pumping light source; and an output instructing unit configured to input an output instruction to the control unit, the output instruction causing the output unit to output the laser light, wherein, when the output instruction is input to the control unit, the control unit controls the seed laser light source and the pumping light source to initiate a pre-pumped state and switch from the pre-pumped state to an output state, and the control unit calculates a duration of time between an end time of a previous output state and the time when the output instruction is input to the control unit, wherein in the pre-pumped state, the seed laser light source outputs low-intensity seed laser light while the pumping light source outputs the pumping light for a predetermined period of time, in the output state, the seed laser light source outputs the seed laser light, and the pumping light source outputs the pumping light, to cause the output unit to output the laser light, and wherein in the pre-pumped state, the control unit sets the intensity of the pumping light output from the pumping light source according to the calculated duration of time.

4. The fiber laser device according to claim 3, wherein the seed laser light output from the seed laser light source in the output state is pulsed light, and the seed laser light output from the seed laser light source in the pre-pumped state is continuous light.

5. The fiber laser device according to claim 3, further comprising:

a wavelength converter provided between the amplification optical fiber and the output unit and configured to perform no wavelength conversions on light output from the amplification optical fiber by the seed laser light and the pumping light in the pre-pumped state, and to perform wavelength conversion on the laser light output from the amplification optical fiber by the seed laser light and the pumping light in the output state; and an optical filter provided between the wavelength converter and the output unit, and configured, when light in the same wavelength band as the seed laser light is input to the wavelength converter, to pass light having a wavelength thereof converted by the wavelength converter, and to restrain transmission of light not having a wavelength thereof converted by the wavelength converter.

6. The fiber laser device according to any one of claims 1 to 5, wherein the intensity of the pumping light in the pre-pumped state is equal to or lower than an intensity of the pumping light in the output state.

7. The fiber laser device according to any one of claims 1 to 5, further comprising:

a memory configured to store a table containing relationship between a predetermined duration of time and the intensity of the pumping light in the pre-pumped state, wherein the control unit obtains the intensity of the pumping light in the pre-pumped state from the memory using the calculated duration of time.

* * * * *